United States Patent
Buczkowski et al.

[11] Patent Number: 5,937,566
[45] Date of Patent: Aug. 17, 1999

[54] FISHING BOBBER WITH VARIABLE ILLUMINATION

[76] Inventors: Andrzej Buczkowski, 1110 D Sheridan Ave., Elizabeth, N.J. 07208; Witalis Talejko, Warszawa ul. Mickiewicza 27 m. 104, Warszawa 04-562, Poland

[21] Appl. No.: 09/036,142

[22] Filed: Mar. 6, 1998

Related U.S. Application Data

[60] Provisional application No. 60/041,452, Mar. 24, 1997.
[51] Int. Cl.⁶ .................................................. A01K 75/02
[52] U.S. Cl. .................................................. 43/17.5
[58] Field of Search .................................................. 43/17.5

[56] References Cited

U.S. PATENT DOCUMENTS

| | | | |
|---|---|---|---|
| 4,157,627 | 6/1979 | Tschelisnik | 43/17 |
| 4,748,761 | 6/1988 | Machovina | 43/17 |
| 4,884,355 | 12/1989 | Neihoff et al. | 43/17 |
| 5,119,578 | 6/1992 | Johnson | 43/17 |
| 5,157,857 | 10/1992 | Livingston | 43/17.6 |
| 5,199,205 | 4/1993 | Klammer | 43/17 |
| 5,351,431 | 10/1994 | Ryu | 43/17 |
| 5,351,432 | 10/1994 | Tse | 43/17.5 |
| 5,826,366 | 10/1998 | Matibe | 43/17.5 |

*Primary Examiner*—Michael J. Carone
*Assistant Examiner*—Fredrick T. French, III

[57] ABSTRACT

A fishing bobber with variable illumination is provided and is comprised of in combination, an elongated body having a upper body member and a lower body member which are detachable from each other, illuminating means at the upper end of the upper body member, anodic eyelet means at the bottom end of the lower body member, first sensing means in the upper body member, second sensing means in the upper body member at a point between the illuminating means and the first sensing means whereby the illuminating commences when the first sensing means makes contact with water and increases in intensity when the second sensing means makes contact with water.

6 Claims, 2 Drawing Sheets

FISHING BOBBER WITH VARIABLE ILLUMINATION

RELATED APPLICATIONS

This application claims priority of U.S. Provisional application No. 60/041,452, filed on Mar. 24, 1997.

BACKGROUND OF THE INVENTION

1) Field of the Invention

This invention is directed to a fishing bobber having a variable illumination. In one aspect, this invention relates to a bobber which emits light of a variable intensity depending upon its depth in the water. In a further aspect, a fishing bobber is provided which emits light of different intensities depending upon the degree to which it is pulled downward in water in response to a fish strike.

2) Background Art

A variety of fishing bobbers is disclosed in the prior art, some of which are fitted with light devices which denote their location during night fishing. For example, U.S. Pat. No. 5,199,205, which issued Apr. 6, 1993 to M. S. Klammer, discloses and claims a fishing bobber which is illuminated for night fishing and changes color when a fish strikes the bait. The bobber has a hollow transparent guide mounted on a body member and a light device positioned in the guide to illuminate it. The body member is pulled down when a fish strikes revealing a colored light signal which is different from the light illuminated by the guide. However, this bobber involves moving parts, which over time after long periods of immersion in water may not function entirely as expected.

It is therefore an object of this invention to provide a fishing bobber with variable illumination. Another object of this invention is to provide a fishing bobber which can be used at night and indicate the location of the bobber and if a fish strikes, the illumination is greatly increased. A further object is to provide a bobber which can be used during the day and which illuminates only when a fish strikes the bait. The greater the strike, the greater the illumination. these and other objects will readily become apparent to those skilled in the art in the light of the teachings herein set forth.

SUMMARY OF THE INVENTION

In its broad aspect, the present invention relates to a fishing bobber with variable illumination comprises of in combination, a hollow, elongated body member having illuminating means and means for increasing the intensity of the illumination as the bobber moves deeper into the water.

DETAILED DESCRIPTION OF THE PREFERRED EMBODIMENTS

In its broad aspect, the present invention is directed to a fishing bobber with variable illumination comprised of in combination, an essentially hollow, elongated body having an upper body member and a lower body member which are detachable from each other, illuminating means at the upper end of the upper body member, anodic eyelet means at the bottom end of the lower body member, first sensing means in the upper body member, second sensing means in the upper body member at a point between the illuminating means and the first sensing means whereby the illuminating commences when the first sensing means makes contact with water and increases in intensity when the second sensing means makes contact with water.

Figure 1:
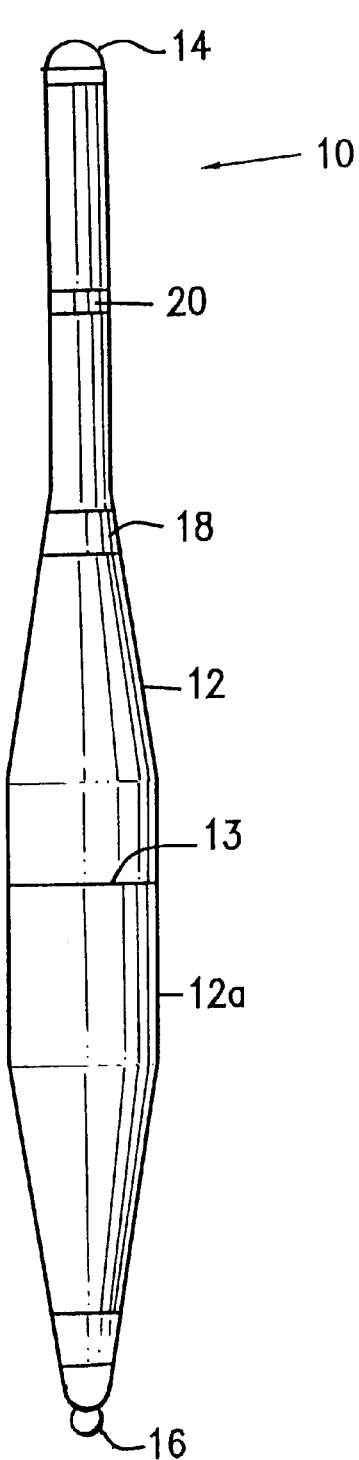
FIG. 1 is a plan view of the fishing bobber of the present invention.

The invention will be more readily understood by reference to the drawings wherein:

FIG. 1 is a plan view of the exterior of bobber 10 showing upper body 12 and lower body 12a which are sealably engaged and detachable at point 13. A light emitting diode (LED) 14 is located at the upper end of upper body 12. The LED is preferably contained within the upper interior of body 12 to avoid contact with water. Since the walls of the body are thin and preferably comprised of plastic, the end portion of the upper body 12 can emit light through the plastic wall. While red or yellow are the preferred colors for ease of detection, especially at night, other colors can be employed. At the lowest end of the lower body member 12a, there is located metallic eyelet 16 which serves both as the anode to complete a circuit through water to either or both sensors located at 18 and 20, and also to serve as a loop through which fishing line can be threaded and/or weights attached. First and second sensors (not shown) are located at 18 and 20 respectively and are comprised of thin wires, the ends of which are exposed to the exterior. for aesthetic purposes most of the wire can be concealed by a strip of tape surrounding the upper body 12 and of a contrasting color to that of the bobber itself.

As the bobber descends into the water a circuit is completed first through anode 16 and the first sensor 18 to cause the LED to illuminate, and if the bobber descends further into the water, such as would result from a fish strike, a second more intense light occurs by completion of the circuit through anode 16 and the second sensor.

In some instances it may be desirable to attach a small weight to the bobber so that it sinks sufficiently to cause the LED to provide the dim light for example during night fishing. When a fish strikes the line the second sensor will be activated. The bobber is preferably fabricated from plastic or other waterproof material which is light and easily molded. The bobber can, of course, be fabricated into other configurations than the one shown in the drawings. When engaged, the upper and lower body members form an essentially watertight seal.

Figure 2:
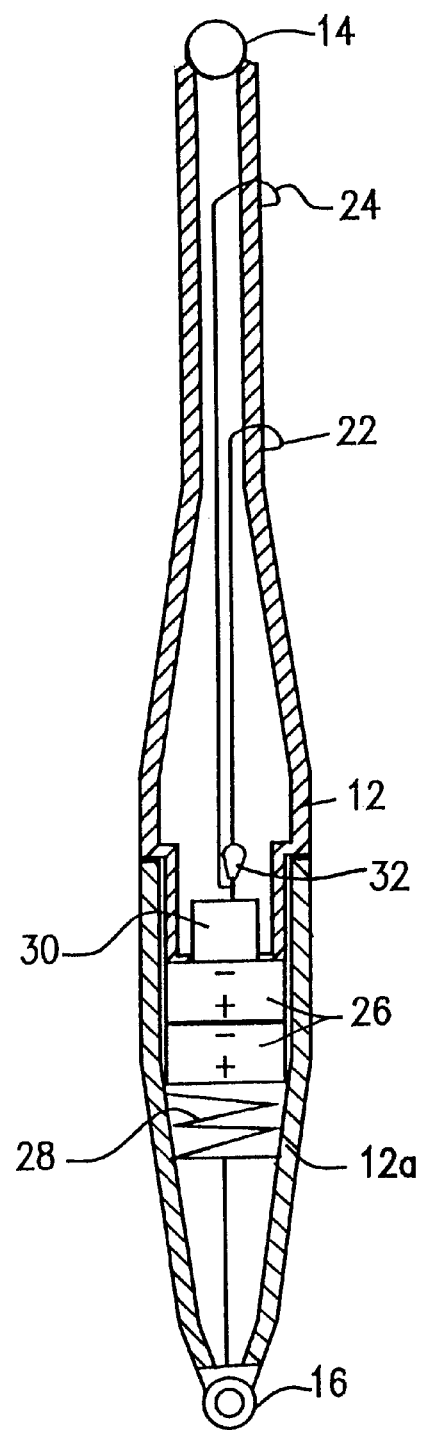
FIG. 2 is a cross-sectional view of the interior of the fishing bobber showing the location of the power supply, sensors and light emitting diode.

FIG. 2 is a cross-sectional view of the bobber shown in FIG. 1. first and second sensors 22 and 24, also referred to as sensing means are shown as thin wires with their ends protruding from the bobber in the form of loops. Other configurations can also be used as long as at least a small portion of the sensor wire is exposed so as to complete the circuit with the anode when immersed in water. First sensor 22 connects through resistor 32 to transistor 30. Second sensor 24 connects to the wire leading from sensor 22, but at a point on the furthermost side of resistor 32. Transistor 30 is comprised of plastic and is disposed within the lower end of the upper bobber body 12 in a manner which insures contact with the negative pole side of batteries 26 which are postioned in lower body member 12a. Transistor 30 has a metal contact (not shown) such as a wire on its bottom side which contacts the top battery and leads into the transistor wherein connection is made with the wires of the sensing members 22 and 24 as well as LED 14. Transistor 30 is a commercially available item and marketed under one or more codes such as CBC-548-C. Batteries 26 are of the same type available for use in electronic wrist watches.

Figure 3:
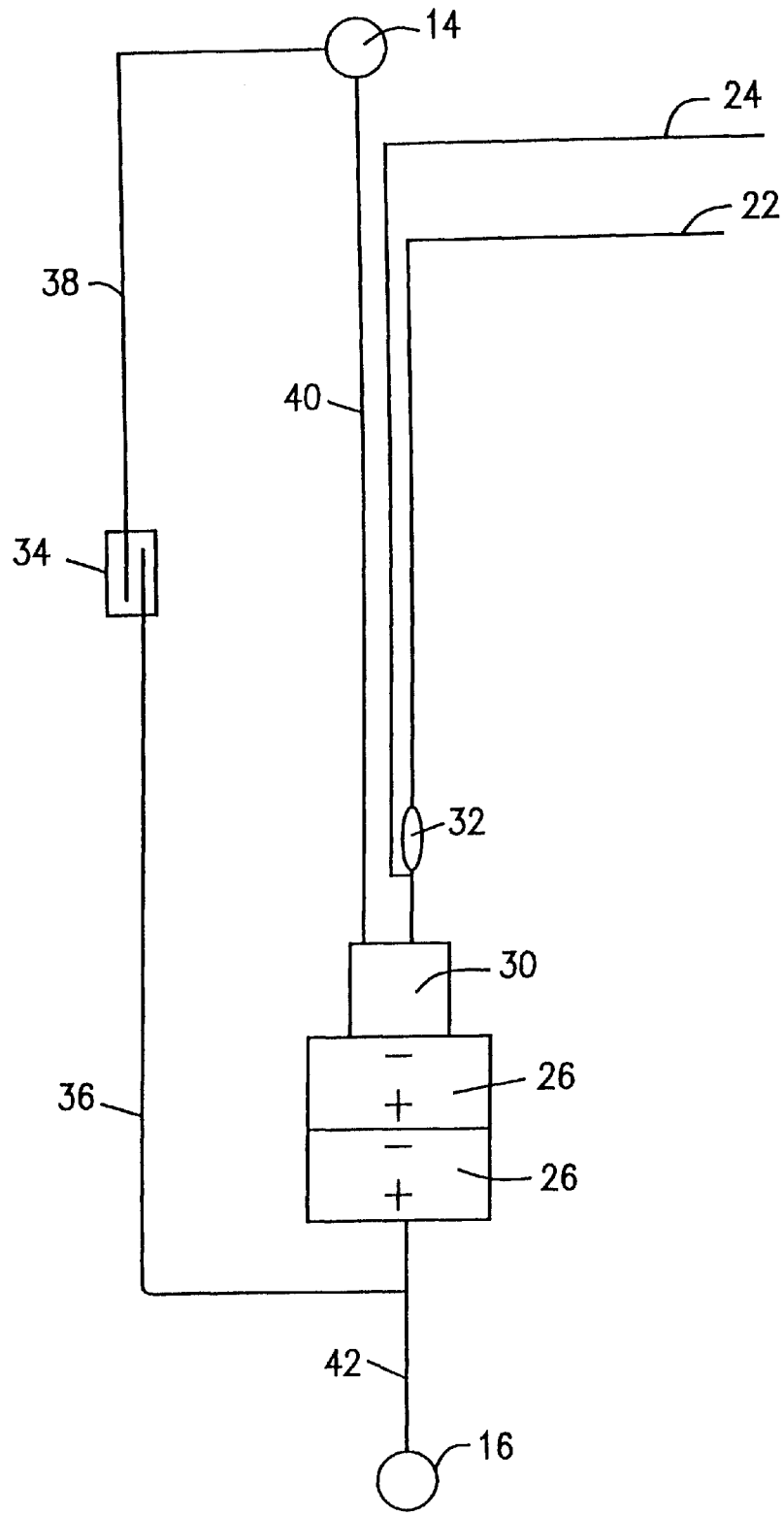
FIG. 3 is a schematic diagram of the circuitry inside the fishing bobber.

FIG. 3 is a simple schematic diagram of the circuitry employed in the bobber of the present invention. As previously indicated, upper body member 12 is detachable from lower body member 12a for replacement of batteries 26. the batteries which can be used are of the SR 41 (1EC) type which are widely used in electronic watches. Equivalents are available from most battery manufacturers: UCAR 384, 392; VARTA 527, 547; Toshiba WG 3, and the like, the batteries are positioned in the bobber so that the (+) side is facing down.

Since the upper and lower bodies detach, transistor 30 remains positioned in the upper body member and the batteries remain positoned in the lower body member. A tire leading from the (+) side of the batteries to LED 14 is detachable at 34. Item 34 is simply a narrow plastic tube or sleeve into which both wires 36 and 38 are inserted to complete the circuit when the upper and lower bodies and reconnected after a battery change. Wire 40 leads from LED 14 to transistor 30 and completes a circuit with anode 16 and either or both sensors 22 and 24 when immersed in water.

Resistor 32 (labeled red, black, green and gold) reduces the current to LED 14 when first sensor 22 is immersed in water. Since sensor 24 does not connect through resistor 32, an increase in current flows to LED 14, resulting in an increase in ilumination. Wire 42 leads from battery 26 to anode 16.

The bobber of the present invention is unique in several respects. It informs the fisherman of motion in the fish line visually and at the same time indicates location of the bobber if fishing at night or when visibility is not good. Accordingly, the fisherman can put sufficient weights on the bobber to cause it to sink to a depth sufficient just to activate the dim light for location of the bobber. this will aid in knowing where the bobber is. However, if a fish strikes, the bobber will undoutedly will be pulled further into the water, activating the bright light. Moreover, the bobber is relatively simple in design and inexpensive to make and operate.

Although the invention has been illustrated by the preceding disclosure it is not to be construed as being limited to the materials employed therein. Various modifications and embodiments thereof can be made without departing from the spirit or scope thereof.

What is claimed is:

1. A fishing bobber with variable illumination wherein light is emitted by the bobber to indicate location, and when a fish strikes, the illumination is greatly increased, said bobber comprised of in combination, an elongated body having an upper body member and a lower body member which are detachable from each other, a source of power contained in the lower body member, illuminating means at the upper end of the upper body member, anodic means at the bottom end of the lower body member, first sensing means in the upper body member, second sensing means in the upper body member at a point between the illuminating means and the first sensing means whereby the illuminating commences when the first sensing means makes contact with water and increases in intensity when the second sensing means makes contact with water.

2. The fishing bobber of claim 1 wherein the illuminating means are light emitting diodes.

3. The fishing bobber of claim 1 wherein the elongated body is hollow.

4. The fishing bobber of claim 1 wherein the elongated body is comprised of plastic.

5. The fishing bobber of claim 1 wherein the emitted light is yellow is color.

6. The fishing bobber of claim 1 wherein the source of power for the light supply is a battery contained in the lower body member.

* * * * *